(12) United States Patent
Bretagne et al.

(10) Patent No.: US 11,252,571 B2
(45) Date of Patent: Feb. 15, 2022

(54) METHOD FOR PERSONALIZING PRE-GENERATED PROTECTED PROFILES AND CORRESPONDING SYSTEM

(71) Applicant: THALES DIS FRANCE SA, Meudon (FR)

(72) Inventors: Eric Bretagne, Gemenos (FR); Lionel Rozak-Draicchio, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 17/051,521

(22) PCT Filed: Apr. 30, 2019

(86) PCT No.: PCT/EP2019/061096
§ 371 (c)(1),
(2) Date: Oct. 29, 2020

(87) PCT Pub. No.: WO2019/211295
PCT Pub. Date: Nov. 7, 2019

(65) Prior Publication Data
US 2021/0227395 A1    Jul. 22, 2021

(30) Foreign Application Priority Data
May 2, 2018  (EP) .................................... 18305543

(51) Int. Cl.
*H04W 4/60*  (2018.01)
*H04W 12/30*  (2021.01)
(Continued)

(52) U.S. Cl.
CPC ............ *H04W 12/35* (2021.01); *H04W 4/60* (2018.02); *H04W 8/205* (2013.01); *H04W 12/40* (2021.01); *H04W 12/72* (2021.01)

(58) Field of Classification Search
CPC ........ H04W 12/35; H04W 4/60; H04W 12/72
See application file for complete search history.

(56) References Cited

U.S. PATENT DOCUMENTS

2016/0050557 A1*  2/2016  Park .................... H04W 12/04
                                                        455/419
2016/0088096 A1*  3/2016  Quiriconi ............... H04W 4/50
                                                        709/219
(Continued)

FOREIGN PATENT DOCUMENTS

EP          3007404 A1    4/2016
KR     20160115832 A    10/2016

OTHER PUBLICATIONS

International Search Report and Written Opinion issued in corresponding International Patent Application No. PCT/EP2019/061096, 13 pages (dated Jul. 15, 2019).
(Continued)

*Primary Examiner* — Barry W Taylor
(74) *Attorney, Agent, or Firm* — Buchanan Ingersoll & Rooney PC

(57) ABSTRACT

A method for personalizing pre-generated protected profiles, as defined by the GSMA SGP.02 and SGP.22 RSP Technical Specifications, includes adding an application and diversified data at the end of the profiles in order to re-compute only the SCP03t security at the end of the profiles and to transmit the protected profiles to eUICCs cooperating with terminals.

6 Claims, 5 Drawing Sheets

| Profile Element | Comments |
|---|---|
| Profile Header | |
| PE-MF | |
| PE-PUKCodes | Only one set of PUK codes exist in a Profile Package |
| PE-PINCodes | Creates the Global PIN codes |
| PE-Telecom | |
| PE-GenericFileManagement | To be repeated in order to create the files required in the DF Phonebook under DF Telecom |
| PE-USIM | Creates a USIM ADF and the associated files |
| PE-OPT-USIM | |
| PE-PHONEBOOK | Creates DF PHONEBOOK under USIM ADF USIM |
| PE-AKAParameter | Sets the AKA parameters related to the previously created USIM |
| PE-PINCodes | Creates the local PIN code structure at the USIM ADF level |
| PE-GenericFileManagement | To be repeated in order to create additional files required in the ADF USIM |
| PE-GSM-Access | |
| PE-SecurityDomain | Creates the MNO-SD |
| PE-SecurityDomain | Creates a SSD |
| PE-RFM | Sets the RFM parameters |
| PE-Application | Loads a USAT application |
| PE-Application | Loads an application in the SSD |
| PE-Application-1 | Loads a dedicated application for personalization data (IMSI, MSISDN,...) |
| PE-End | End of the profile package | with the two last elements:

| PE-Application-1 | Applet byte code, installation parameters, AID... | 1KB |
|---|---|---|
| | Personalization data | 15-100 bytes |
| PE-End | End of the profile package | 9 bytes |

(51) Int. Cl.
*H04W 12/72* (2021.01)
*H04W 12/40* (2021.01)
*H04W 8/20* (2009.01)

(56) References Cited

U.S. PATENT DOCUMENTS

| | | | |
|---|---|---|---|
| 2016/0142906 A1* | 5/2016 | Park | H04W 12/02 |
| | | | 455/419 |
| 2017/0222991 A1 | 8/2017 | Yang | |
| 2018/0070224 A1 | 3/2018 | Park et al. | |
| 2019/0166488 A1* | 5/2019 | Park | H04W 12/106 |
| 2019/0253563 A1* | 8/2019 | Ullah | H04M 15/725 |
| 2020/0169868 A1* | 5/2020 | Ullah | H04W 12/06 |

OTHER PUBLICATIONS

Office Action (Notice of Preliminary Rejection) dated Sep. 16, 2021 in corresponding Korean Patent Application No. 10-2020-7033516 and English translation of the Office Action. (10 pages).

\* cited by examiner

FIG.1

| Profile Element | Comments |
|---|---|
| Profile Header | |
| PE-MF | |
| PE-PUKCodes | Only one set of PUK codes exist in a Profile Package |
| PE-PINCodes | Creates the Global PIN codes |
| PE-Telecom | |
| PE-GenericFileManagement | To be repeated in order to create the files required in the DF Phonebook under DF Telecom |
| PE-USIM | Creates a USIM ADF and the associated files |
| PE-OPT-USIM | |
| PE-PHONEBOOK | Creates DF PHONEBOOK under USIM ADF USIM |
| PE-AKAParameter | Sets the AKA parameters related to the previously created USIM |
| PE-PINCodes | Creates the local PIN code structure at the USIM ADF level |
| PE-GenericFileManagement | To be repeated in order to create additional files required in the ADF USIM |
| PE-GSM-Access | |
| PE-SecurityDomain | Creates the MNO-SD |
| PE-SecurityDomain | Creates a SSD |
| PE-RFM | Sets the RFM parameters |
| PE-Application | Loads a USAT application |
| PE-Application | Loads an application in the SSD |
| PE-End | End of the profile package |

FIG.2

| Profile Element | Comments |
|---|---|
| Profile Header | |
| PE-MF | |
| PE-PUKCodes | Only one set of PUK codes exist in a Profile Package |
| PE-PINCodes | Creates the Global PIN codes |
| PE-Telecom | |
| PE-GenericFileManagement | To be repeated in order to create the files required in the DF Phonebook under DF Telecom |
| PE-USIM | Creates a USIM ADF and the associated files |
| PE-OPT-USIM | |
| PE-PHONEBOOK | Creates DF PHONEBOOK under USIM ADF USIM |
| PE-AKAParameter | Sets the AKA parameters related to the previously created USIM |
| PE-PINCodes | Creates the local PIN code structure at the USIM ADF level |
| PE-GenericFileManagement | To be repeated in order to create additional files required in the ADF USIM |
| PE-GSM-Access | |
| PE-SecurityDomain | Creates the MNO-SD |
| PE-SecurityDomain | Creates a SSD |
| PE-RFM | Sets the RFM parameters |
| PE-Application | Loads a USAT application |
| PE-Application | Loads an application in the SSD |
| PE-Application-1 | Loads a dedicated application for personalization data (IMSI, MSISDN,....) |
| PE-End | End of the profile package | with the two last elements:

| PE-Application-1 | Applet byte code, installation parameters, AID... | 1KB |
|---|---|---|
| | Personalization data | 15-100 bytes |
| PE-End | End of the profile package | 9 bytes |

FIG.3

| SCP03t Blocks of profile | |
| --- | --- |
| Block 1 | ProfileHeader, PE-MF |
| Block 2 | End of PE-MF, PE-PUKCodes |
| Block 3 to n-1 | PE-PINCodes .... PE-Application, Beginning of PE-Application-1 with personalization data |
| Block n | End of PE-Application-1 with personalization data, PE-End |

FIG.7

| SCP03t Blocks of profile | |
| --- | --- |
| Block 1 | ProfileHeader, PE-MF |
| Block 2 | End of PE-MF, PE-PUKCodes |
| Block 3 to n-1 | PE-PINCodes .... Beginning of PE-Application |
| Block n | End of PE-Application, PE-End |

FIG.6

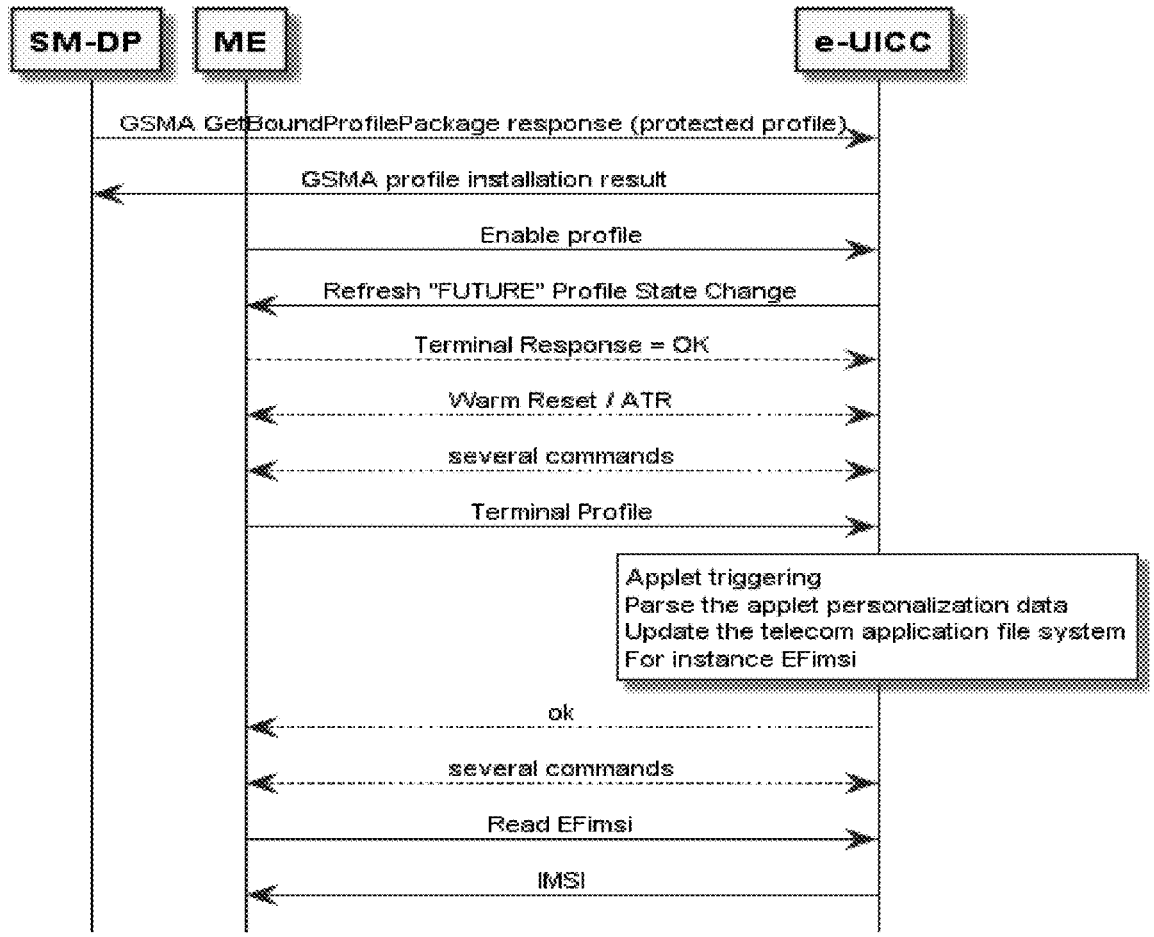

METHOD FOR PERSONALIZING PRE-GENERATED PROTECTED PROFILES AND CORRESPONDING SYSTEM

BACKGROUND

The invention concerns telecommunication systems.

More precisely, the invention concerns the customization of pre-generated protected profiles as defined in GSMA and SIM Alliance for any Consumer and M2M secure element, in particular for eUICCs (embedded UICCs).

It is known that the number of IMSIs (International Mobile Subscriber Identity) still available is limited at some operators, especially in countries having an important number of citizens, like China or India for example.

An IMSI is constituted by a MCC (Mobile Country Code), a MNC (Mobile Network Code) and a MSIN (Mobile Subscriber Identification Number). For a given operator (MNO), the number of MSINs still available is limited.

IMSIs are stored in secure elements profiles comprised in eUICCs for example.

The problem is that when a eUICC profile is manufactured and personalized with an IMSI, this IMSI is only used when the eUICC profile is downloaded to an end-user or when an apparatus comprising the eUICC is powered on for the first time. There are therefore a huge amount of IMSIs that are not used and this represents a cost for the MNO.

In order to solve this problem, it is known to download over the air and on demand IMSIs on secure elements like eUICCs. A Subscription Manager Data Preparation (SM-DP) is an element of a telecommunication network which role is to securely download and install operator subscription profiles into eUICCs. The SM-DP securely stores profiles to be provisioned on the eUICCs. The SM-DP manages the installation of these profiles onto the eUICCs.

More precisely, the GSMA SM-DP is provisioned with pre-generated profiles protected using SCP03t security. SCP03t is an evolution/optimization of the SCP03 protocol defined by Global Platform Amendment D.

In the pre-generated profile, all the diversified data are generated in advance to reduce the workload and the execution time of the SM-DP.

Using the SM-DP, during the profile reservation, the MNO wants to provide profile custom data ("diversified data" hereinafter) like the IMSI, the IP multimedia private identity (IMPI) or the IP multimedia public identity (IMPU). Consequently the pre-generated protected profile shall be updated to inject all the MNO diversified data.

In such a procedure, different SCP03t blocks of the pre-generated profile shall be updated and recomputed by the SM-DP using a HSM (Hardware Security Module). The HSM computes SCP03t encryption and MACs (Message Authentication Codes).

FIG. 1 represents an example of a profile as defined by the SIMalliance.specification (section 8.1.3 of eUICC Profile Package: Interoperable Format TS v2.0).

As for the standards, the two GSMA specs SGP.02 v3.2 (M2M) and SGP.22 v2.2 (Consumer) refer to the same SIM Alliance v2.0 spec concerning the profile format (UPP: Unprotected Profile Package). So referring to the GSMA specifications involves referencing the SIM Alliance specification.

GSMA specifications define the SCP03t protocol that protects these profiles (PPP: Protected Profile Package) as well as the client system (eUICC)/server (SM-DP).

Specifically, the SGP.22 spec refers to GSMA spec SGP.02 for the SCP03t protocol. Different profile elements are represented in FIG. 1. It always begins with a field comprising a profile header and ends with a PE-End, "PE" meaning Profile Element.

A SCP03t block takes a maximum of 1008 bytes (up to 1007 bytes of data and at least 1 byte of padding for the last block). These fields are enclosed in the SCP03t blocks transmitted to the eUICC.

In the SCP03t all the blocks are chained using the MAC.

For instance, a first MAC called MAC1 is computed on a first SCP03t block containing the first Profile Elements (PE) like the PE-Header and the PE-MF. A second MAC, called MAC2, is computed by taking into account the content of the second SCP03t block and MAC1. Thus, each MAC takes into account the preceding MAC (each MAC is chained with the previous MAC). This MAC chaining implies that if a data block is modified to inject a diversified data (like for example an IMSI, an IMPI or an IMPU), the SCP03t of the current data block and all the following blocks shall be recomputed, because the MAC of the current data block is changed.

The main problem of this is that, for example concerning the IMSI, the IMSI sent by the MNO being located in the PE-USIM block, since this IMSI is changed, it is necessary to re-compute the SCP03t block containing the PE-USIM and all MACs following this block. This necessitates to use a plurality of HSMs when the demand for downloading new subscriptions on secure elements is high.

The order may change for some PEs (they have however constraints in the SIM Alliance specification).

Some PEs are also optional and other PEs may be added in the future (for example for the future 5G).

The order of the different profile elements can change but the SIMalliance specification provides in particular that the security domains and the applications shall be located at the end of profile. It means that it is not possible to isolate the telecom applications to be customized by the MNO like USIM, ISIM, CSIM . . . at the end of the profile.

Thus, the major SM-DP constraint is to update only a small part of a profile and at the end of the profile to avoid to re-compute all the SCP03t blocks of the profile, avoiding very significant performance impact with a significant additional cost of hardware and software resources. This re-computing is necessary when a MNO sends for example an IMSI to a SM-DP in order to personalize a eUICC profile before the profile download and installation.

The single alternative is to deploy additional resources allowing to absorb very high computing power. There would be two possible solutions:
  Either using additional SM-DP instances and additional HSMs in the cluster;
  Or using an additional server infrastructure called RTDP (Real Time Data Processing) connected to the SM-DP. The RTDP having its dedicated instances and its dedicated HSMs.

In the both cases, the impact on costs is disproportionate compared to the micro operations done on the profile (replacing a dummy IMSI by an IMSI received from the MNO).

This problem is solved by the invention.

SUMMARY

More precisely, the invention proposes a method for personalizing pre-generated protected profiles as defined by the GSMA SGP.02 and SGP.22 RSP Technical Specifications, the method consisting to add an application and diversified data at the end of the profiles in order to re-compute only the SCP03t security only at the end of the profiles and to transmit the protected profiles to eUICCs cooperating with terminals.

Advantageously, the application takes in charge the pre-generated profile personalization when triggered in the eUICCs.

Preferably, the diversified data comprise an IMSI.

The invention also concerns a system for personalizing a pre-generated protected profile as defined by the GSMA SGP.02 and SGP.22 RSP Technical Specifications, the system comprising a SM-DP dedicated to receive from a mobile network operator diversified data to be applied in the protected profile and a eUICC cooperating with a terminal receiving the protected profile, the SM-DP storing pre-generated protected profiles, the SM-DP sending to the eUICC a pre-generated protected profile containing an application and the diversified data at the end of the pre-generated protected profile.

In one embodiment, before sending the pre-generated protected profile, the SM-DP is adding to the pre-generated protected profile an application and the diversified data at the end of the pre-generated protected profile.

In another embodiment, before sending the pre-generated protected profile, the SM-DP storing pre-generated protected profiles, the pre-generated protected profile being either without modification or containing an application and dummy diversified data at the end of the protected profile, the SM-DP adding an application with its diversified data or overwriting the dummy diversified data to the pre-generated protected profile.

BRIEF DESCRIPTION OF THE DRAWINGS

Other features and advantages of the invention will appear by reading the following description in regard of the figures that represent:

FIG. 1 an example of a profile of the state of the art;

FIG. 2 a profile according to the present invention;

FIGS. 3 and 7 examples of the protected profiles with SCP03t blocks;

FIGS. 5 to 6 different alternatives for installing the personalization data (diversified data) like the IMSI for example in the eUICC.

DETAILED DESCRIPTION

FIG. 1 has been presented previously for explaining the state of the art.

FIG. 2 represents a profile according to the present invention.

In this figure, as can be seen in the last two lines, a PE-Application, called PE-Application-1, is foreseen at the end of the profile, just before the PE-End profile element.

The principle of the invention is precisely to add at the end of the profile a small dedicated applet (Profile Element application) taking in charge the MNO custom data overwrite.

In the PEapplication-1, the applet byte code is defined, followed by its diversified data, a for example an IMSI, an IMPI or an IMPU.

The idea is to use this diversified data to inject the MNO diversified data with all the dependency files (USIM EF_IMSI, EF_AD, ISIM EF_IMPI, EF_IMPU, EF_AD, . . . )

In the pre-generated profile, two possible implementations: Either the dedicated applet and its diversified data are included, indicating by default no new custom data or the dedicated applet and its diversified data are inserted at the end just before the Profile Element End (PE-End).

In the table at the bottom of this figure, we can see the profile representation according to the SIMalliance with the additional dedicated applet.

The applet (or application) is composed by byte codes. Installation parameters are also included in the PE-Application-1 and for example an AID. The size of these data is approximately of 1 KB.

The PE-Application-1 also contains the diversified data, among with for example the IMSI to be sent to the eUICC. This may represent between some tens and some hundreds of bytes depending on the number of data to be personalized.

Like aforementioned, the profile ends with a PE-End (9 bytes).

FIG. 3 represents an example of the protected profile with SCP03t blocks according to the invention.

In this figure, all blocks 1 to n are SCP03t blocks. The first block contains the ProfileHeader and the beginning of PE-MF. The second block contains the end of PE-MF and the PE-PUKCodes. The following blocks contain the profile elements of FIG. 2, the block n−1 containing the beginning of the PE-Application-1 with diversified data. The last block (n) contains the end of PE-Application-1 with diversified data and PE-End.

Figure 4:
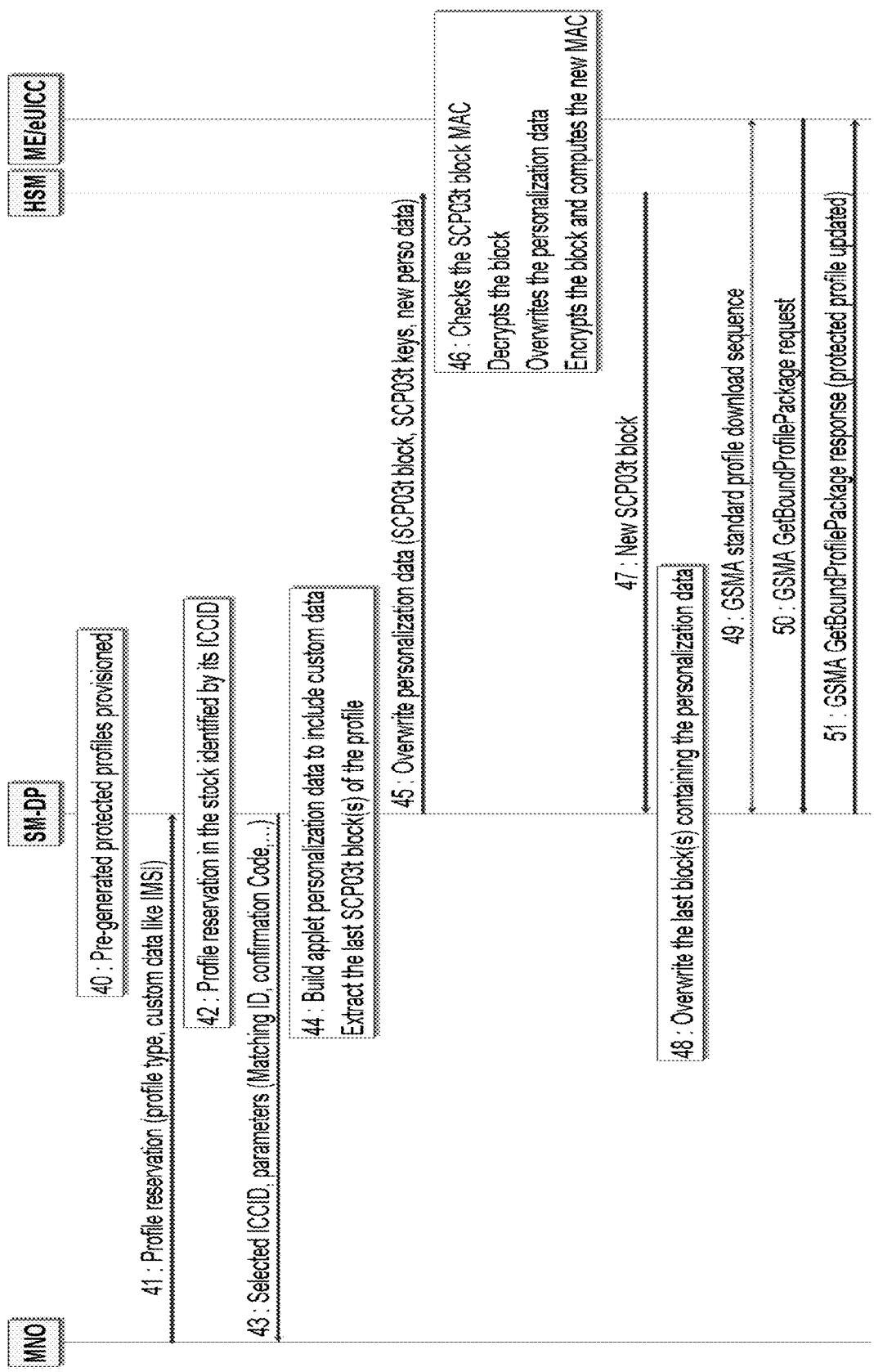
FIG. 4 a flow of exchanges between different entities.

FIG. 4 represents a flow of exchanges between different entities.

Here, a MNO asks, at a step 40, a profile reservation to a SM-DP. The profile reservation comprises a profile type (international, prepaid, . . . ) and diversified data, like an IMSI.

At a previous step 40, the SM-DP has pre-generated protected profiles and has provisioned them.

At step 42, the SM-DP verifies if it has a corresponding profile in stock, thanks to a ICCID (to each ICCID corresponds a profile).

At step 43, the SM-DP informs the MNO that he has a profile, sends him the corresponding ICCID along with parameters (Matching ID, confirmation Code, . . . ).

At step 44, two solutions are possible:

1. At 40, the SM-DP stores pre-generated profiles without modification (like shown in FIG. 1). It has then to add at the end of the profile just before the PE-End the PE-Application-1 and the received diversified data;

2. At 40, the SM-DP already stores the PE-Application-1 for diversified data with a dummy diversified data in its pre-generated profiles. It replaces the dummy diversified data by the diversified data received at step 41 by the mobile network operator (MNO).

It has to be noted that the diversified data are not limited to an IMSI, it can also be all the diversified data stored into the telecom applications like UICC, USIM, ISIM, CS-IM . . . . In the case of IMSI customization, in the PE-USIM, the field IMSI is dummy it will be replaced by the applet PE-Application-1.

The SM-DP also extracts the last SCP03t block (or two blocks if necessary—this is a question of length of the diversified data and length of last SCP03t block) of the profile. In a first solution, the protected pre-generated profile already contains the application PE-Application-1 with its dummy diversified data, in FIG. 3, the last two blocks shall be extracted since the n−1 block contains the beginning of PE-Application-1 with diversified data. If the PE-Application-1 with diversified data and PE-End can be comprised in the last block (n), only the last SCP03t block has to be extracted.

At step 45, the last block(s) are sent to a HSM that checks, at step 46, the SCP03t block MAC(s). It decrypts the block, overwrites the diversified data (TLV-Tag Length Value), encrypts the block and computes a new MAC (or new MACs if necessary).

At step 47, the HSM sends the new SCP03t block to the SM-DP.

At step 48, the SM-DP overwrites the last block(s) containing the diversified data.

Steps 49 to 51 are standard in GSMA (the SM-DP sends the protected profile (all the SCP03t blocks) to the eUICC).

In a second implementation, the protected pre-generated profile doesn't contain the application PE-Application-1 with its diversified data. In FIG. 7, the last block shall be extracted by the SM-DP, the SM-DP shall generate the PE Application containing the PE-Application-1 with its diversified data. At step 45, the last block and the PE application-1 are sent to a HSM that checks, at step 46, the SCP03t block MAC. It decrypts the block, inserts the PE Application-1 containing the diversified data, encrypts the block(s) and computes the new MAC(s).

Step 47 up to step 51 are unchanged compared to the previous description.

Figure 5:
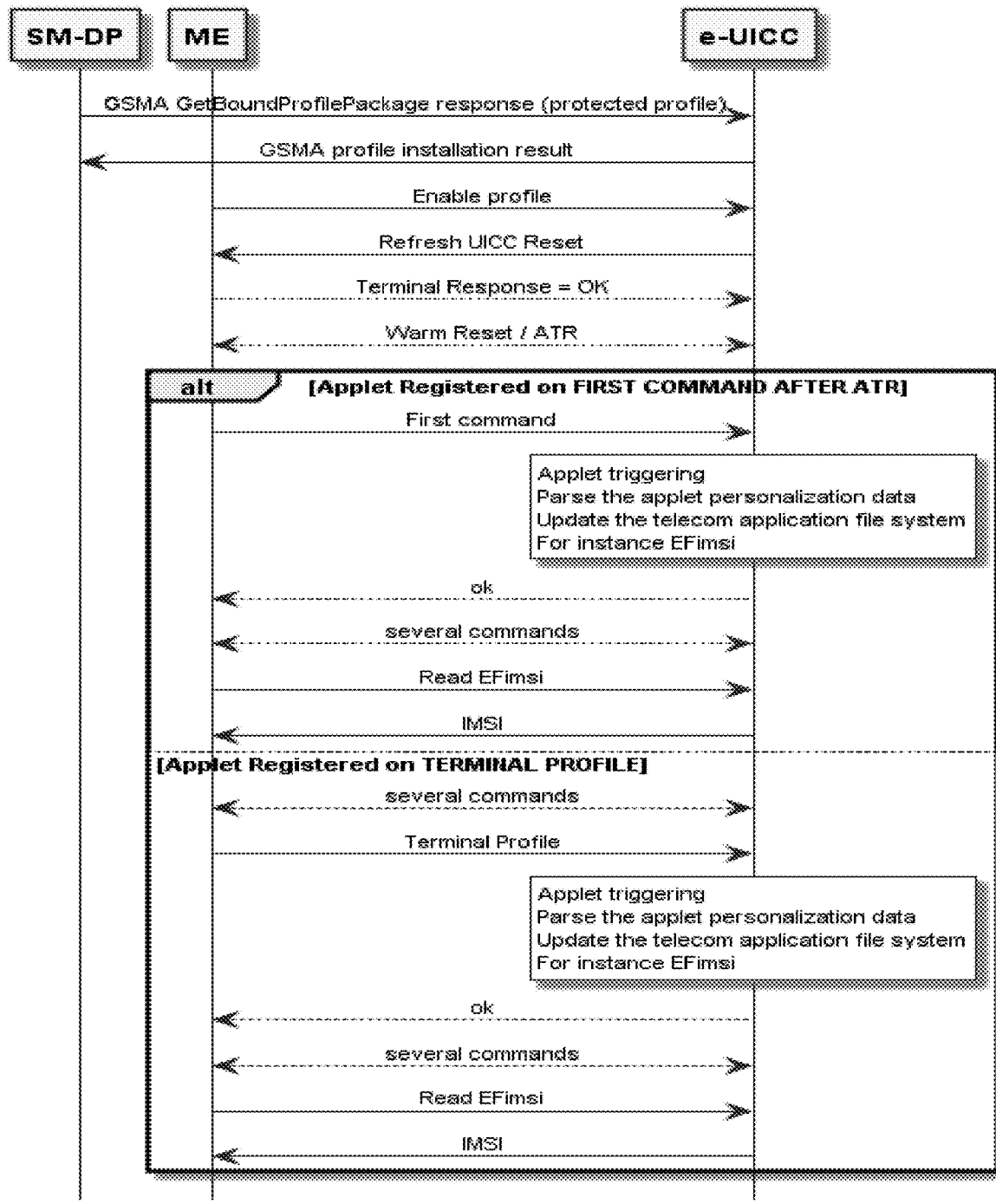

FIG. 5 shows the profile enabling procedure using the UICC Refresh command and two alternatives triggering the applet installing the diversified data like the IMSI in the eUICC profile.

The first alternative is to use, after standard exchanges between the SM-DP, the ME and the eUICC, after a warm reset (only a reset of the eUICC when the eUICC is powered on), any command from the ME to the eUICC to trigger the applet (PE-Application-1) in order that this applet parses the diversified data (among which the IMSI) in the different files, especially in the EFimsi file if the IMSI has to be personalized. After that, several exchanges are done and the IMSI is transmitted to the ME by the eUICC.

The second alternative consists in using the Terminal Profile command (used when there is a boot between the ME and the eUICC). The same operations as described just before happened and it ends with a transmission of the IMSI to the ME.

FIG. 6 shows the profile enabling procedure using the future Profile State Change command (not standardized at the time of filing this patent application), the applet installing the personalization (diversified) data being triggered by the Terminal profile.

Using its diversified data, the dedicated applet is able to update all the telecom applications files targeted with the new MNO custom data before that the mobile equipment reads the eUICC telecom applications and files system.

After having installed the profile, the eUICC informs the SM-DP that the profile has been installed in the eUICC. The user (Mobile Equipment ME) then authorizes the profile (step "Enable profile"). The eUICC sends a UICC reset or a Profile State Change command to the ME. The ME then answers with a Terminal response "OK" and starts the classical boot sequence with the eUICC.

Another alternative is to, after download of the SCP03t blocks, to execute immediately in the eUICC, the applet diversified data in the eUICC profile.

So, the applet uses the diversified data provided by the SM-DP and takes in charge the pre-generated profile personalization when triggered in the eUICC.

The main advantage of the invention is that only the last block containing diversified data and PE-End shall be to be recomputed by the HSM. The major interest is to avoid to re-compute all the security (SCP03t) associated to the protected profile.

The invention allows to customize online the pre-generated profiles on MNO demand to inject MNO diversified data and end user diversified data.

For some MNOs, it solves the issue of the IMSI (or other diversified data) pre-reservation stock unused while not downloaded.

The invention avoids to deploy additional server resources allowing to absorb very high computing power, consequently it allows to reduce significantly the solution cost avoiding new hardware investment with its additional recurrent hosting costs.

Without the invention, a HSM is able to customize up to 6 profiles of 64 KB per second. With the invention, a HSM should be able to customize up to 100 profiles per second (whatever the size of the profile).

The proposed solution doesn't require 3GPP/GSMA/SI-Malliance standard modifications, the solution being interoperable (applet PE application-1, profile, eUICC).

The invention claimed is:

1. A method for personalizing in SM-DP pre-generated protected profiles as defined by the GSMA SGP.02 and SGP.22 RSP Technical Specifications, wherein said method comprises:
adding an application and diversified data immediately preceding a PE-End profile element in order to re-compute only a SCP03t protocol block at the end of the pre-generated protected profiles, and
transmitting said pre-generated protected profiles to eUICCs cooperating with terminals.

2. The method according to claim 1, wherein said application takes charge of the pre-generated profile personalization when triggered in said eUICCs.

3. The method according to claim 1, wherein said diversified data comprise an IMSI.

4. A system for personalizing in a SM-DP a pre-generated protected profile as defined by the GSMA SGP.02 and SGP.22 RSP Technical Specifications, said system comprising:
a SM-DP dedicated to receive, from a mobile network operator, diversified data for application in said protected profile, and
an eUICC, cooperating with a terminal, configured to receive said pre-generated protected profile, said SM-DP storing pre-generated protected profiles,
wherein said SM-DP sends, to said eUICC, a pre-generated protected profile containing an application and said diversified data immediately preceding a PE-End profile element.

5. The system according to claim 4, wherein before sending said pre-generated protected profile, said SM-DP adds to said pre-generated protected profile said application and said diversified data immediately preceding the PE-End profile element.

6. The system according to claim 4, wherein before sending said pre-generated protected profile, said SM-DP stores pre-generated protected profiles, said pre-generated protected profile being either without modification or containing an application and dummy diversified data immediately preceding a PE-End profile element, and said SM-DP adds an application with its diversified data or overwrites said dummy diversified data to said pre-generated protected profile.

* * * * *